(12) United States Patent
Weigl (10) Patent No.: US 11,065,714 B2
(45) Date of Patent: Jul. 20, 2021

(54) DEVICE AND METHOD FOR THE RESIDUE-FREE FRICTION STIR WELDING OF WORKPIECES WITH HEIGHT DIFFERENCES BETWEEN THE JOINT PARTNERS

(71) Applicant: GRENZEBACH MASCHINENBAU GMBH, Asbach-Baeumenheim (DE)

(72) Inventor: Markus Weigl, Donauwoerth (DE)

(73) Assignee: GRENZEBACH MASCHINENBAU GMBH, Asbach-Bäumenheim (DE)

( * ) Notice: Subject to any disclaimer, the term of this patent is extended or adjusted under 35 U.S.C. 154(b) by 238 days.

(21) Appl. No.: 16/086,792

(22) PCT Filed: Mar. 15, 2017

(86) PCT No.: PCT/DE2017/000066
§ 371 (c)(1),
(2) Date: Sep. 20, 2018

(87) PCT Pub. No.: WO2017/162224
PCT Pub. Date: Sep. 28, 2017

(65) Prior Publication Data
US 2019/0091797 A1    Mar. 28, 2019

(30) Foreign Application Priority Data
Mar. 23, 2016 (DE) .................... 10 2016 003 580.3

(51) Int. Cl.
*B23K 20/12* (2006.01)
(52) U.S. Cl.
CPC ........ *B23K 20/1255* (2013.01); *B23K 20/122* (2013.01); *B23K 20/123* (2013.01);
(Continued)

(58) Field of Classification Search
None
See application file for complete search history.

(56) References Cited

U.S. PATENT DOCUMENTS

| 9,937,586 B2 | 4/2018 | Weigl et al. |
| 9,956,644 B2 * | 5/2018 | Foerg ............. B23K 20/123 |

(Continued)

FOREIGN PATENT DOCUMENTS

| CN | 101176945 | 5/2008 |
| CN | 103949769 | 7/2014 |

(Continued)

*Primary Examiner* — Devang R Patel
(74) *Attorney, Agent, or Firm* — Duane Morris LLP (57) ABSTRACT

The invention relates to a method and a device for the residue-free friction stir welding of workpieces with different thicknesses, having the following method steps: a) two workpieces (6) to be welded are mounted such that the workpieces can be approached by a holding bell (3) for the friction stir welding tool and the drive head (2) thereof, b) after the welding device is started up, a welding pin tip (5) is immersed into the plastified material of the two workpieces (6) to be connected, wherein a welding shoe (4) is used which has a trapezoidal structure that extends in the diagonal direction of the welding shoe (4) for receiving the welding pin tip (5), and a circular opening (14) is mounted in a web with a smoothing surface (13) which has a front edge (12) that is part of a stepped Spahn guide stage (11), c) in order to improve the method, a welding shoe (4) is used in which the stepped Spahn guide stage (11) has material conducting channels on the front edge (12).

6 Claims, 7 Drawing Sheets (52) U.S. Cl.
CPC ........ *B23K 20/129* (2013.01); *B23K 20/1245* (2013.01); *B23K 20/1285* (2013.01)

(56) References Cited

U.S. PATENT DOCUMENTS

| | | | |
|---|---|---|---|
| 2008/0011810 A1* | 1/2008 | Burford | B23K 20/1255 228/2.1 |
| 2013/0239397 A1* | 9/2013 | Hotte | B23B 51/101 29/525 |
| 2014/0119814 A1* | 5/2014 | Osikowicz | B23K 20/1225 403/270 |
| 2016/0263696 A1* | 9/2016 | Nishida | B23K 20/128 |
| 2017/0080527 A1 | 3/2017 | Weigl | |

FOREIGN PATENT DOCUMENTS

| | | | |
|---|---|---|---|
| DE | 202014000747 | 2/2014 | |
| DE | 202014000747 U1 * | 2/2014 | ........... B23K 20/123 |
| DE | 202015005763 | 9/2015 | |
| EP | 1314509 | 5/2003 | |
| EP | 2561948 | 2/2013 | |
| JP | 2015085382 | 5/2015 | |

* cited by examiner

DEVICE AND METHOD FOR THE RESIDUE-FREE FRICTION STIR WELDING OF WORKPIECES WITH HEIGHT DIFFERENCES BETWEEN THE JOINT PARTNERS

CROSS-REFERENCE TO RELATED APPLICATIONS

This application is a § 371 national stage entry of International Application No. PCT/DE2017/000066, filed on Mar. 15, 2017, which claims priority to German Patent Application No. 10 2016 003 580.3, filed Mar. 23, 2016, the entire contents of which are incorporated herein by reference.

The invention relates to a device and to a method for the residue-free friction stir welding of workpieces with height differences in the joining partners caused by production tolerances.

It has been demonstrated in practice in orbital welding operations for pipes which are used for installing underground power lines that the two pipe ends that are to be welded in some instances run into the friction tool at a significant height difference. The cause for such height differences are production tolerances of several millimeters in the diameter of the pipes to be welded, which production tolerances in the abutment joint provided can lead to one side lying up to 2 mm higher than the respective other. In such cases, existing devices and methods of friction stir welding cannot meet the requirements made of the welding result, in particular in the case of the welding of power lines that are to be installed underground. The same apparently applies in an analogous manner to the welding of planar structures which in the abutment joint have height differences of up to 2 mm.

In terms of the prior art, reference is furthermore made to EP 2 561 948 A1 which relates to a method and to a system for producing a flange-pipe-flange element by means of friction stir welding. Such a system according to the preamble of claim 11 is based on the objective of simplifying the centering of the flange and the pipe, and of utilizing the weld pool backing, besides supporting the region that is softened by the friction stir welding, also for absorbing the contact pressure forces in friction stir welding and for centering the pipe according to the longitudinal axis of the flanges while dispensing with measuring and setting-up procedures while simultaneously reducing the fabrication times and while saving material and guaranteeing economic advantages. To this end it is claimed in the characterizing part of claim 11 that the weld pool backing is configured as a pneumatically stressable and releasable clamp and support disk for centering the pipe on the rotation axis of the flanges and for absorbing the contact pressure forces in friction stir welding, and that a sensor for sensing the abutment joints between the pipe and the flange is provided, and that furthermore a device for driving in and out a dummy wedge in alignment with the tangential plane that lies horizontally above the rotation axis and runs through the abutment joint is provided in order for the friction stir welding pin of the friction stir welding tool to be moved out of the friction-stir-welded abutment joint in a hole-free manner, wherein the sensor and the device for driving in and out the dummy wedge is connected to the controller.

In friction stir welding, frictional heat which renders the materials to be welded in a plasticized state is generated in the joint region of the materials to be welded by means of the friction between a rotating tool that is simultaneously moved in a translatory manner and is applied with pressure. The tool herein is moved along the joint region and stirs the plasticized material in the interior of the seam of the mutually abutting materials to be connected. The tool is pulled out of the connection region at the end of said seam, and the weld seam is immediately capable of bearing a load. Furthermore known from the prior art is pre-published DE 10 2015 005 763 U1, filed by the present applicant, which relates to a device for the homogeneous welding of structures that are curved in a planar manner by friction stir welding. A welding result which already satisfies high quality requirements can indeed by achieved by way of the device known from said publication, but it cannot be entirely precluded herein that minor unevenesses are to be noted when the welding pin is pulled out during the termination of the welding procedure.

Moreover, it has to be taken into account that the peripheries of the structures to be welded do not mutually abut smoothly but do have slight unevenesses which for achieving a planar face necessitate the feeding of "filler material" during the welding procedure.

The present invention is therefore based on the object of specifying a device and a method for enabling a residue-free welding of workpieces having height differences of up to 2 mm in the abutment joint, in particular of tubular structures and other applications, by means of friction stir welding, such that no flashovers can arise even when the weld seam is charged with electrical high tension.

This object is achieved by the features in patent claim 1.

Device for the residue-free friction stir welding of workpieces of dissimilar thicknesses, in particular of tubular structures, said device having the following features:
a) a drive head (2) which by means of a receptacle head (1) is guided by a guiding machine, and a holding bell (3) for a welding shoe (4) that by means of a fastening flange (8) is screw-fitted to the drive head (2), form the drive and the guide for a welding pin tip (5);
b) the welding shoe (4) has a circular structure which in the center thereof has a circular opening (14) for receiving the welding pin tip (5), wherein said circular opening (14) is mounted in a web that runs diagonally in relation to the circular structure of the welding shoe (4), said web having a smoothing face (13) in the movement direction (21) of the procedure of friction stir welding, and wherein the smoothing face (13) has a front edge (12) which is part of a step-shaped chip groove (11);
c) the smoothing face (13) has the shape of an elongate trapezoidal structure which extends in the diagonal direction of the welding shoe (4), in which trapezoidal structure in the direction of the advance (21) of the welding shoe (4) in the forward region the wider side extends as a front edge (12), and in the rear region a corresponding narrower side extends as a rear edge (17), wherein furthermore the rear edge (17) forms the delimitation of a run-out face (15) of the smoothing face (13) that is conceived so as to be step-shaped, and wherein the trapezoidal structure is supplemented by a left and a right curve-shaped lateral face (18), the plane normals thereof in each case extending in the direction toward the opening (14);
d) the smoothing face (13) in relation to the vertical reference axis of the welding pin (4) has a small angle of attack (19).

It is furthermore claimed that the chip groove (11) on the left and on the right side of the front edge (12) has material-guiding ducts (22); and that the chip groove (11) on the left and on the right side of the front edge (12) has material-guiding ducts (22) which are connected by a duct track (23). It is also claimed that the chip groove (11) on the left and on the right side has relatively narrow duct tracts (23), the external region of the latter having in each case one material-pathfinding edge (24) that is rounded on the outside;

and by the method according to patent claim 5:

Method for the residue-free friction stir welding of workpieces of dissimilar thicknesses, in particular of tubular structures, comprising the following method steps:

a) two workpieces (6) to be welded, for example two tubular parts in the course of the relocation of a high-tension line, are mounted such that said workpieces (6) can be driven around by a holding bell (3) for the friction stir welding tool and by the drive head (2) for said holding bell (3);

b) after setting the welding device in operation, a welding pin tip (5) plunges into the plasticized material of the two workpieces (6) to be connected and goes around both workpieces (6), wherein a welding shoe (4) is used for leveling height differences, said welding shoe (4) having a trapezoidal structure, extending in the diagonal direction of the welding shoe (4), for receiving the welding pin tip (5), wherein said circular opening (14) is mounted in a web that runs diagonally in relation to the circular structure of the welding shoe (4), said web having a smoothing face (13) in the movement direction (21) of the procedure of friction stir welding, and wherein the smoothing face (13) has a front edge (12) which is part of a step-shaped chip groove (11);

c) in order for the method for leveling height differences to be improved, a welding shoe (4) in which the chip groove (11) on the left and on the right side of the front edge (12) has material-guiding ducts is used.

And in that the chip groove (11) on the left and on the right side of the front edge (12) has material-guiding ducts which are connected by a duct track (23).

It is moreover claimed that the chip groove (11) on the left and on the right side has relatively narrow duct tracks, the external region of the latter having in each case one material-pathfinding edge (24) that is rounded on the outside.

And a computer program having a program code for carrying out the method steps as claimed in one of claims 5 to 7 when the program is executed in a computer. Moreover a machine-readable carrier having the program code of a computer program for carrying out the method when the program is executed in a computer.

The invention will be described in more detail hereunder. In the figures in detail.

Figure 1:
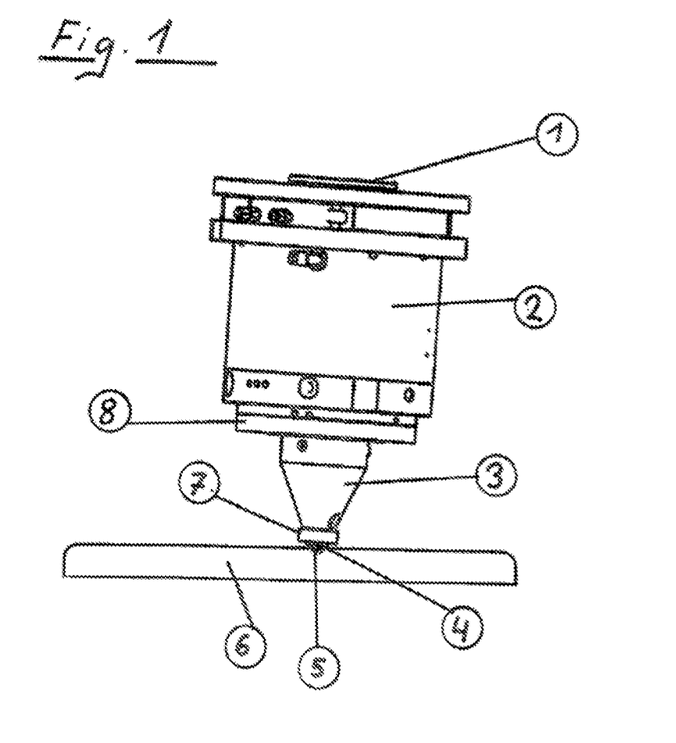
FIG. 1 shows a sectional illustration of an assembly for friction stir welding.

FIG. 1 shows a sectional view of an assembly for friction stir welding. The component 6 to be joined in this case is shown as a planar face. A receptacle head 1 supports a drive head 2 which in turn on the lower side thereof has a receptacle flange 8 for the mounting of a holding bell 3. The holding bell 3 by means of a union nut 7 forms the mechanical mounting of a welding shoe 4 which in the interior thereof guides a rotatable welding pin of which the welding pin tip 5 is indicated in FIG. 1.

Figure 2:
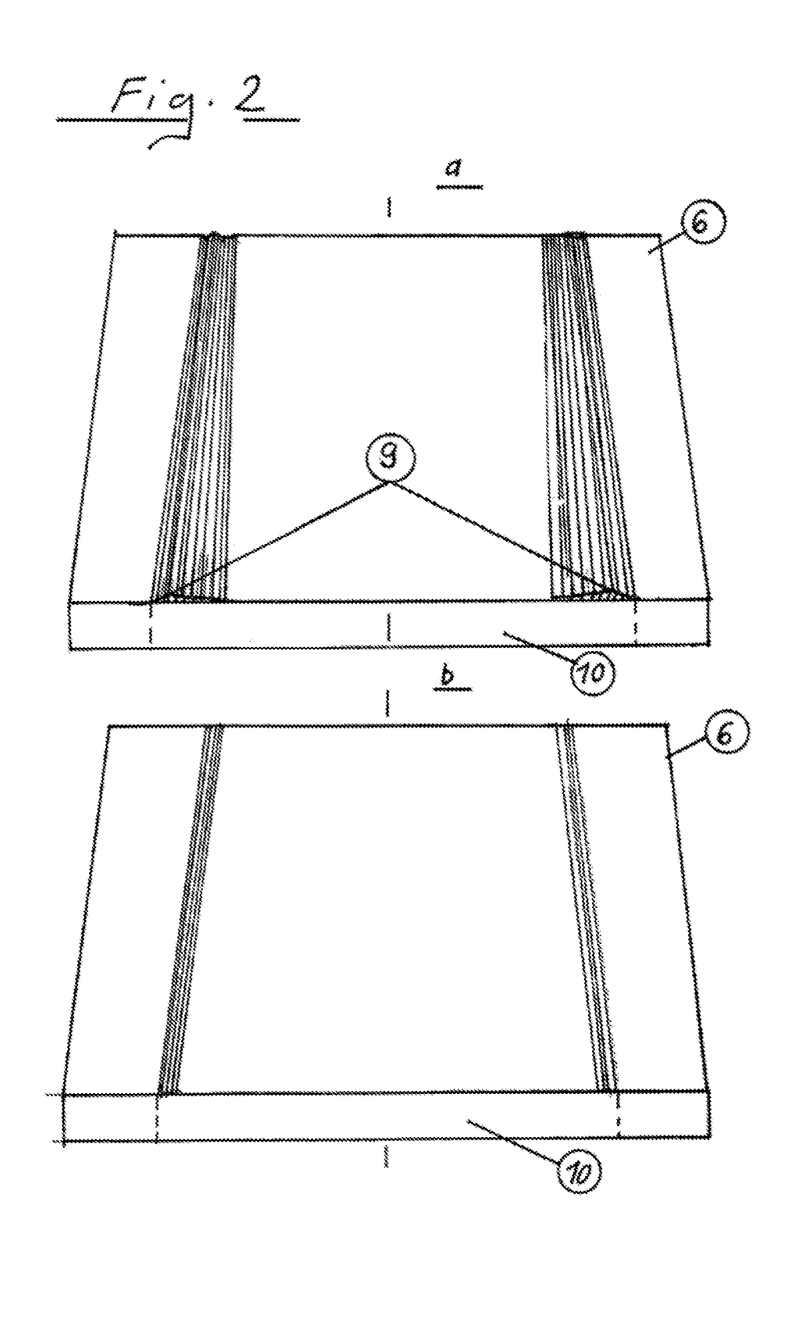
FIG. 2 shows an illustration of an undesirable formation of a peripheral ridge.

FIG. 2 shows an illustration of an undesirable formation of a peripheral ridge. The welding of two components 6 to be joined is illustrated in an exemplary manner in FIG. 2a), wherein in each case one peripheral ridge 9 that runs so as to be parallel with the weld seam is illustrated on the left and the right side in the region of the weld seam. Another weld connection is illustrated in an exemplary manner in FIG. 2b), wherein almost no peripheral ridge 9 has been formed.

Figure 3:
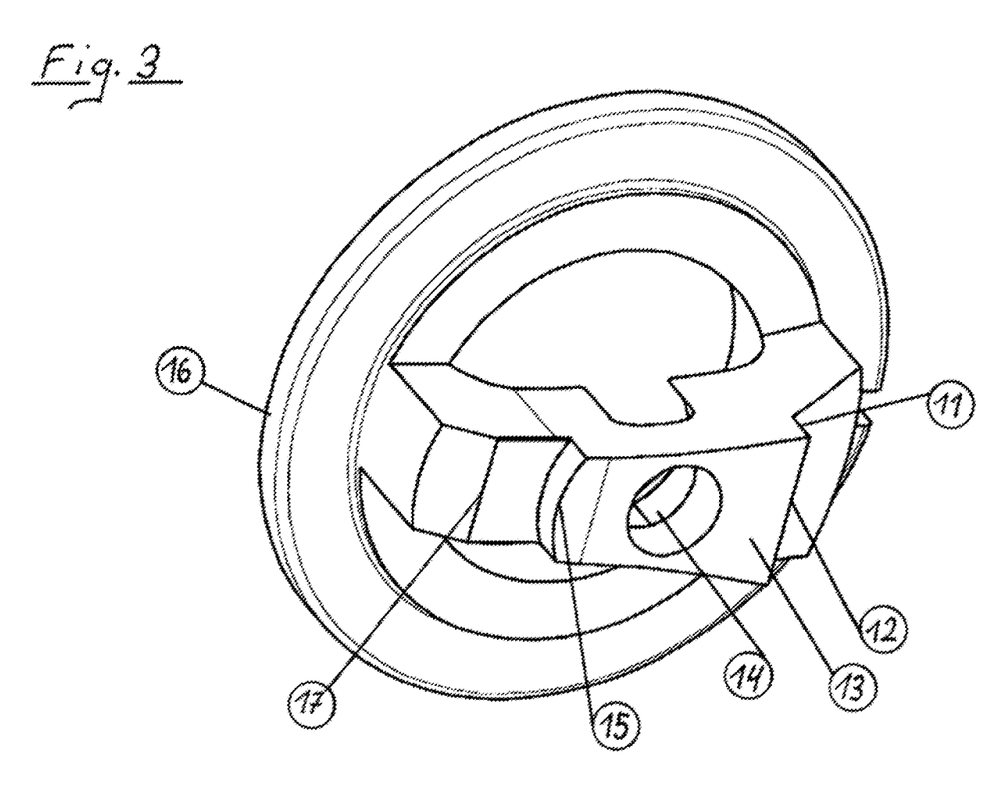
FIG. 3 shows a perspective view of a welding shoe according to the invention.

FIG. 3 shows a perspective view of a welding shoe according to the invention from the lower side. A circular opening which serves for receiving a welding pin that rotates under pressure can be seen in the center of the welding shoe shown, wherein a welding pin tip 5, as is indicated in FIG. 1, causes the actual friction procedure. A trapezoidal smoothing face 13 which is mounted about the opening 14 serves for smoothing the material that has been plasticized by the welding procedure and, above all by way of the chosen form of the face 13 in the manner of a trapezoid, causes to be said material is smoothed by the relatively wide front edge 12 in the direction of the narrower rounded run-off face of the smoothing face 13. A chip groove 11 is disposed upstream of the smoothing face 13, metal chips that are created being discharged toward the left and/or the right by way of said chip groove 11. The holding flange 16 serves for mounting the welding shoe by means of the union nut 7 in FIG. 1. The reference sign 17 in this illustration identifies the rear edge of the smoothing face 17.

Figure 4:
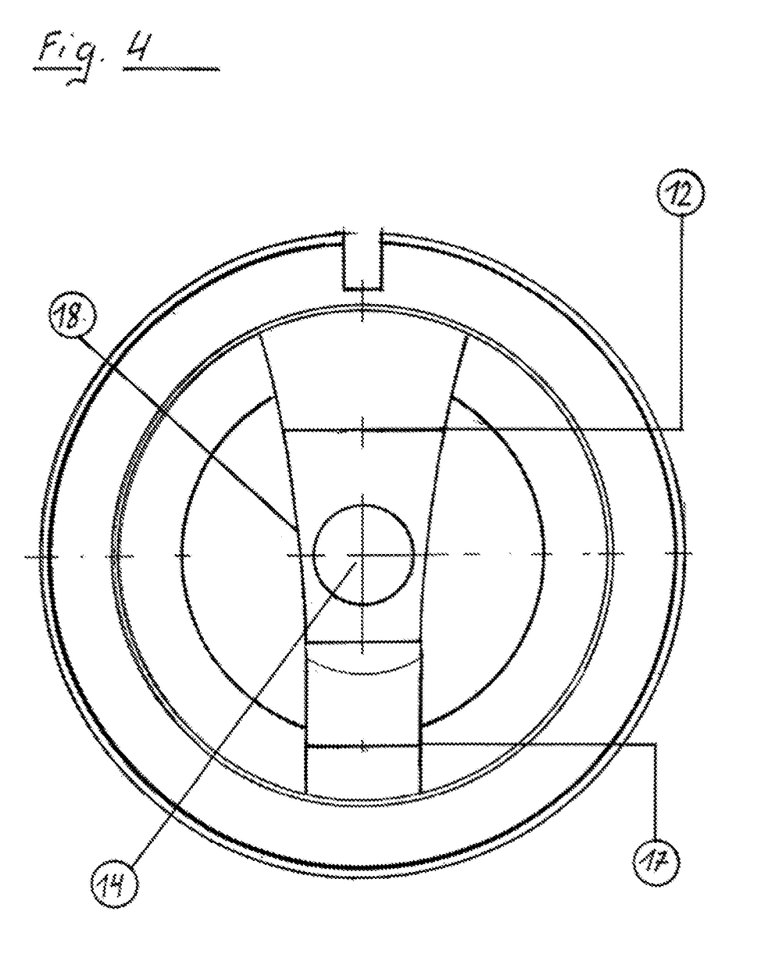
FIG. 4 shows a direct illustration of the welding shoe from below.

FIG. 4 shows a direct illustration of the welding shoe from below. The opening 14 for a welding pin can be seen in the center of the smoothing face (not identified here). Furthermore, the exact arrangement of the front edge 12 and of the rear edge 17 from FIG. 3 can be seen. A particularity that can be seen from FIG. 4 is that the lateral faces 18 of the trapezoidal smoothing face are slightly curved.

Figure 5:
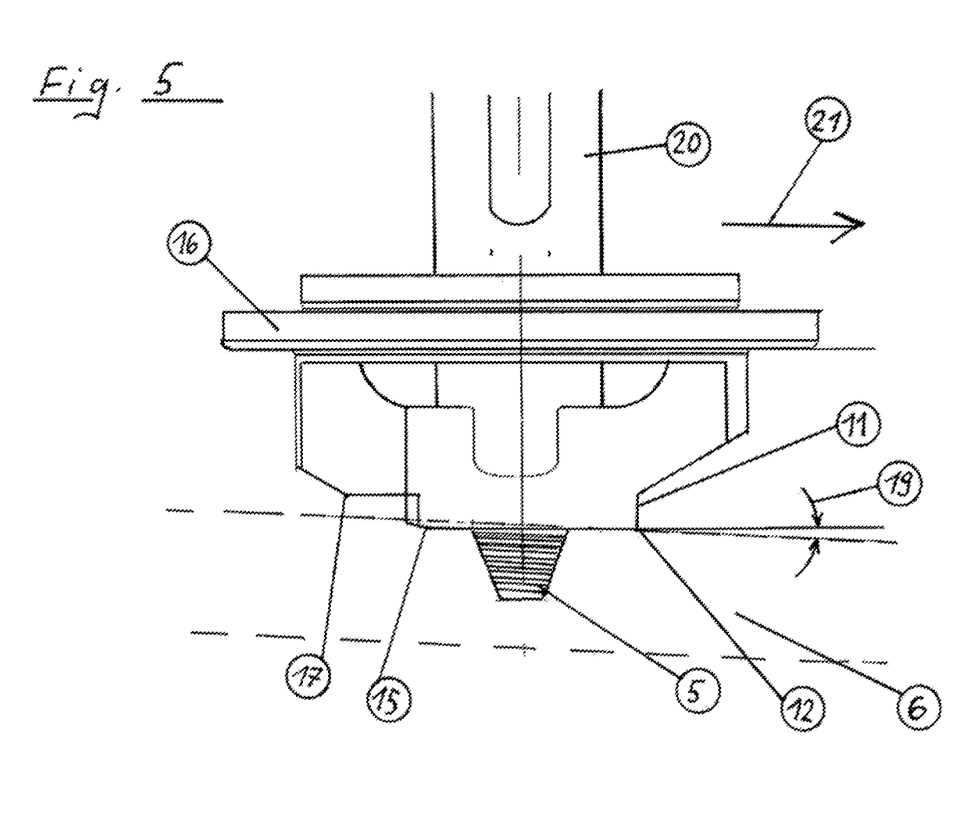
FIG. 5 shows an illustration of a welding shoe in a lateral view.

FIG. 5 shows an illustration of a welding shoe in a lateral view. The direction of the movement of the welding shoe here is identified by 21. The shank 20 of the welding pin on the upper side of the welding shoe finds the equivalent thereof in the welding pin tip 5 on the lower side of the welding shoe. The position and the height of the chip groove 11 and of the front edge 12 of the smoothing face on the front side of the welding shoe in relation to the position and the height of the rear edge 17 of the smoothing face can be readily seen. The type of the run-out face 15 can also be seen in this view. A particularity that can be seen in FIG. 5 is that the smoothing face 13 is inclined at a minor angle of attack 19 in relation to the vertical reference axis of the welding pin. This angle of attack 19 can either be taken into consideration in the tool or be achieved by an angle on the machine in that the machining face is designed as a straight face and the machining mechanism is held at an angle of attack 19. The smoothing face 13 and/or the material-guiding ducts in one particular embodiment can have an additional coating. Chromium nitride layers which are applied in layer thicknesses up to 50 μm by means of PVD methods are to be considered particularly advantageous here.

Figure 6:
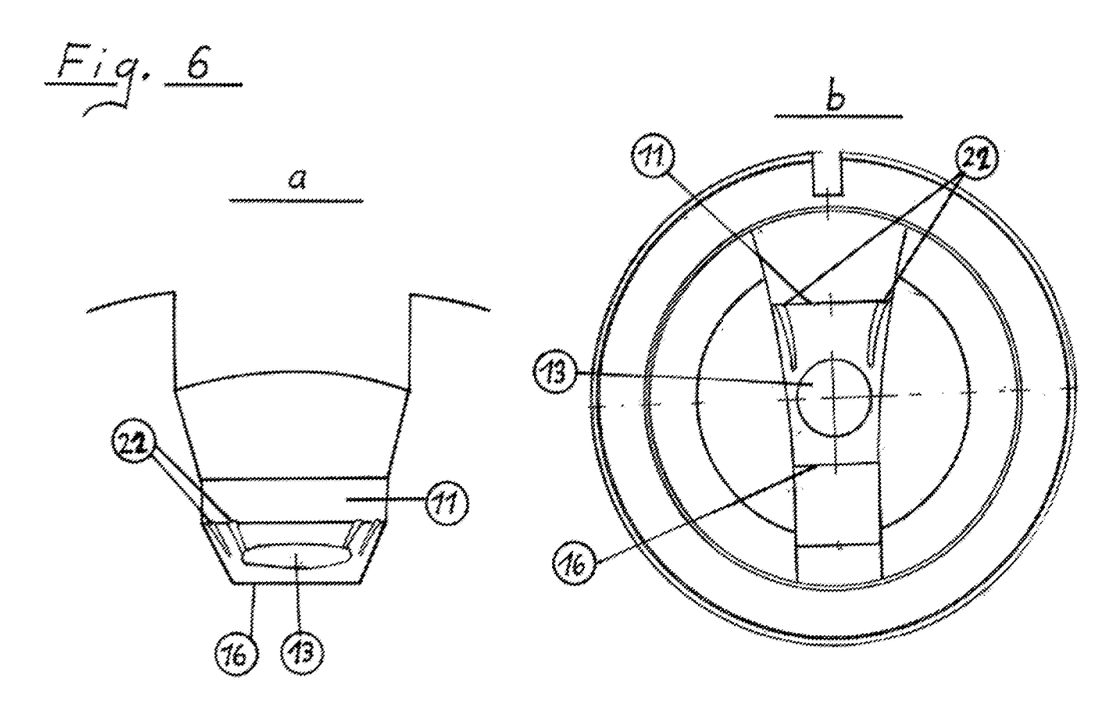
FIG. 6 shows an illustration of a welding shoe having material-guiding ducts.

FIG. 6 shows an illustration of a welding shoe having material-guiding ducts. A perspective view of the welding shoe in which the chip groove 11 is in the foreground is shown in FIG. 6a). In each case two material-guiding ducts 22 can be seen on the left and on the right side on the edge that forms the chip groove having the smoothing face 13, wherein the numeral 13 refers to the entire face. The rear edge 17 of the trapezoidal shoe face is illustrated in the background. The trapezoidal smoothing face 13 having the rear edge 17 thereof and the chip groove 11 thereof can again be seen in the center in the plan view of the entire welding shoe shown in FIG. 6b). In each case one material-guiding duct 22 is shown very clearly here on the left and the right, so as to proceed directly from the edge of the chip groove 11.

Figure 7:
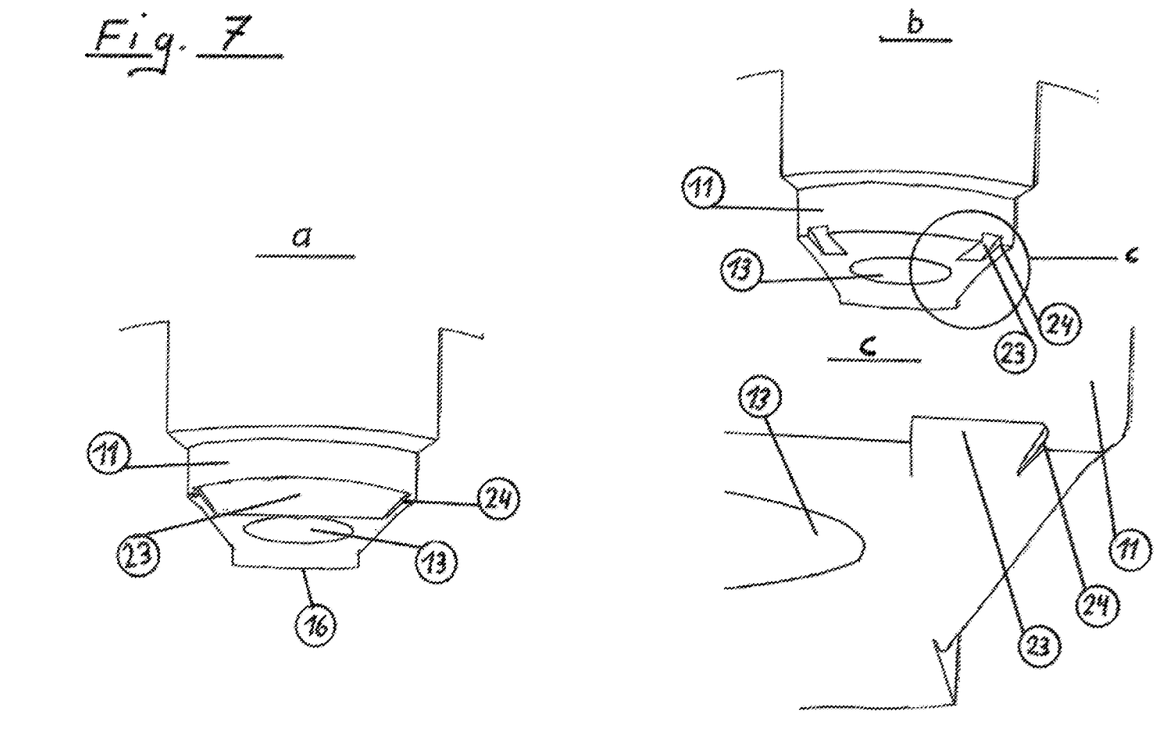
FIG. 7 shows illustrations from the region of the guiding ducts.

FIG. 7 shows illustrations from the region of the guiding ducts. A variant in the form of a "shovel-like" duct track 23 that is lowered on the front edge of said duct track 23 and runs across almost the entire width of the chip groove 11 in the embodiment according to FIG. 7a) is delimited by one material-guiding duct on each of the wide sides of said duct track 23. Said guiding ducts act as "pathfinders" for the plasticized material, so to speak.

As opposed to the version of FIG. 7a), the variant shown in FIG. 7b) instead of a wide "shovel-like" receptacle face in the left and the right region has in each case one corresponding narrower "shovel-like" receptacle face. The latter act as lateral ducts, wherein the height of the central region can deviate from that of the outer pathfinders. The duct edges are designed with sharp edges.

A variant of the version illustrated in FIG. 7b) is shown by means of the version of the design embodiment of the welding shoe illustrated in the circle. This variant likewise has two lateral ducts, wherein each lateral duct however has one duct track 23 as is shown in FIG. 7c). According to the illustration shown, each lateral duct has a round material-pathfinding edge 24 and forms a type of "clearing blade" contour on both internal edges of the lateral ducts. In conjunction with the angle of attack 19 of the tool that is required at all times, the transportation of material and the generation of a defined transition toward the non-welded region can be achieved on account thereof.

The material-pathfinding edge 24 is slightly rounded and therefore has a long service life and is thus subject to little wear.

It goes without saying that the method according to the invention and the device thereof likewise offer better welding results in the presence of workpieces without any height differences.

LIST OF REFERENCE SIGNS

1 Receptacle head
2 Drive head
3 Holding bell for the tool
4 Welding shoe having a trapezoidal smoothing face
5 Welding pin tip
6 Component to be joined
7 Union nut as mounting for a welding shoe
8 Receptacle flange for the holding bell 3
9 Peripheral ridge
10 Region of the weld seam
11 Chip groove
12 Front edge of the trapezoidal smoothing face
13 Smoothing face
14 Opening for a welding pin
15 Run-out face of the trapezoidal smoothing face
16 Holding flange of the welding shoe for the union nut 7
17 Rear edge of the trapezoidal smoothing face
18 Curve-shaped lateral face of the trapezoidal smoothing face
19 Angle of attack of the smoothing face 13
20 Shank of the welding pin
21 Direction of advancing the welding shoe 4
22 Material-guiding ducts
23 Duct track
24 Material-pathfinding edge (duct 22) round

The invention claimed is:

1. A device for stir welding of workpieces, comprising:
a drive head comprising a receptacle head configured to be guided by a guiding machine, and further comprising a holding bell for a welding shoe that is screw-fitted to the drive head by a fastening flange, the drive head configured to drive and guide a welding pin tip;
wherein the welding shoe comprises a circular structure which in the center thereof has a circular opening for receiving the welding pin tip, wherein said circular opening is mounted in a web that runs diagonally in relation to the circular structure of the welding shoe, said web having a smoothing face in the movement direction of the procedure of friction stir welding, and wherein the smoothing face comprises an upper surface bounded by a front edge at a forward region of the upper surface and an intermediate edge at a rear region of the upper surface, wherein the front edge is part of a first step-shaped feature comprising a first lower surface connected to the front edge by a first stepped surface;
wherein the smoothing face further comprises a shape of a trapezoidal structure which extends in the diagonal direction of the welding shoe, wherein the trapezoidal structure in the direction of the advance of the welding shoe comprises the front edge in the forward region and being the wider side of the trapezoidal structure, and in the rear region a corresponding narrower side extends as a rear edge, and wherein the trapezoidal structure further comprises a left and a right curve-shaped lateral face, the plane normals thereof extending in the direction toward the circular opening; and
wherein the smoothing defines an angle of attack relative to a horizontal axis.

2. The device as claimed in claim 1, wherein the first step-shaped feature on the left and on the right side of the front edge comprises material-guiding ducts.

3. The device as claimed in claim 1, wherein the first step-shaped feature on the left and on the right side of the front edge has material-guiding ducts which are connected by a duct track.

4. The device as claimed in claim 1, wherein the first step-shaped feature on the left and on the right side has duct tracks, the external region of the latter having in each case one material-pathfinding edge that is rounded on the outside.

5. The device as claimed in claim 1, wherein the rear edge is part of a second step-shaped feature comprising a second lower surface delimited by the rear edge and a second stepped surface connecting the second lower surface to the intermediate edge at the rear region of the upper surface.

6. The device as claimed in claim 5, wherein the intermediate edge and the second stepped surface are curved.

* * * * *